United States Patent [19]

Ancherico

[11] 3,771,608
[45] Nov. 13, 1973

[54] SANDTRAP MAINTENANCE DEVICE

[75] Inventor: Edward Ancherico, Fayetteville, N.C.

[73] Assignee: Eastern Turf Equipment, Inc., Fayetteville, N.C.

[22] Filed: Sept. 18, 1970

[21] Appl. No.: 73,498

[52] U.S. Cl. .................................. 172/358, 172/198
[51] Int. Cl. ............................................. A01b 3/02
[58] Field of Search ...................... 172/42, 329, 358, 172/389, 390–391, 198; D35/2, 2.1, 2.2, 2.3; 56/74.7, 16.1

[56] References Cited
UNITED STATES PATENTS

| 478,649 | 7/1892 | Songer | 172/198 |
| 2,517,733 | 8/1950 | Takats | 172/42 |
| 473,289 | 4/1892 | Breed | 172/456 |
| 1,835,288 | 12/1931 | Dyrr | 172/198 |
| 3,613,802 | 10/1971 | Carlson et al | 172/197 |

FOREIGN PATENTS OR APPLICATIONS 958,163   1/1957   Germany .............................. 172/42

OTHER PUBLICATIONS

Le Claire Manufacturing Co., Model E "Handy Dandy" Garden Cultivator, Aug. 16, 1954.

John Deere, HD2240 Integral Spring-Tooth Harrow, Apr. 2, 1959, pp. 1, 11, 18

John Deere, Harrow, Lever Controlled HC216, HC324, HC432, Sept. 1955, pp. 1, 3, 5, 12

Sears, Roebuck and Co., 1963 Suburban–Farm Catalog, 1963, pp. 1, 2, 3, 8, 12

Montgomery Ward, 1967 Farm Catalog, 1967, pp. 1, 6–7, 15

Primary Examiner—Robert E. Pulfrey
Assistant Examiner—R. T. Rader
Attorney—John G. Mills, III

[57] ABSTRACT

In abstract, a preferred embodiment of this invention is a self-propelled, attendant guided, sandtrap type maintenance device having trailing earth breaking tines followed by a final breaking and smoothing rake like member.

1 Claim, 5 Drawing Figures

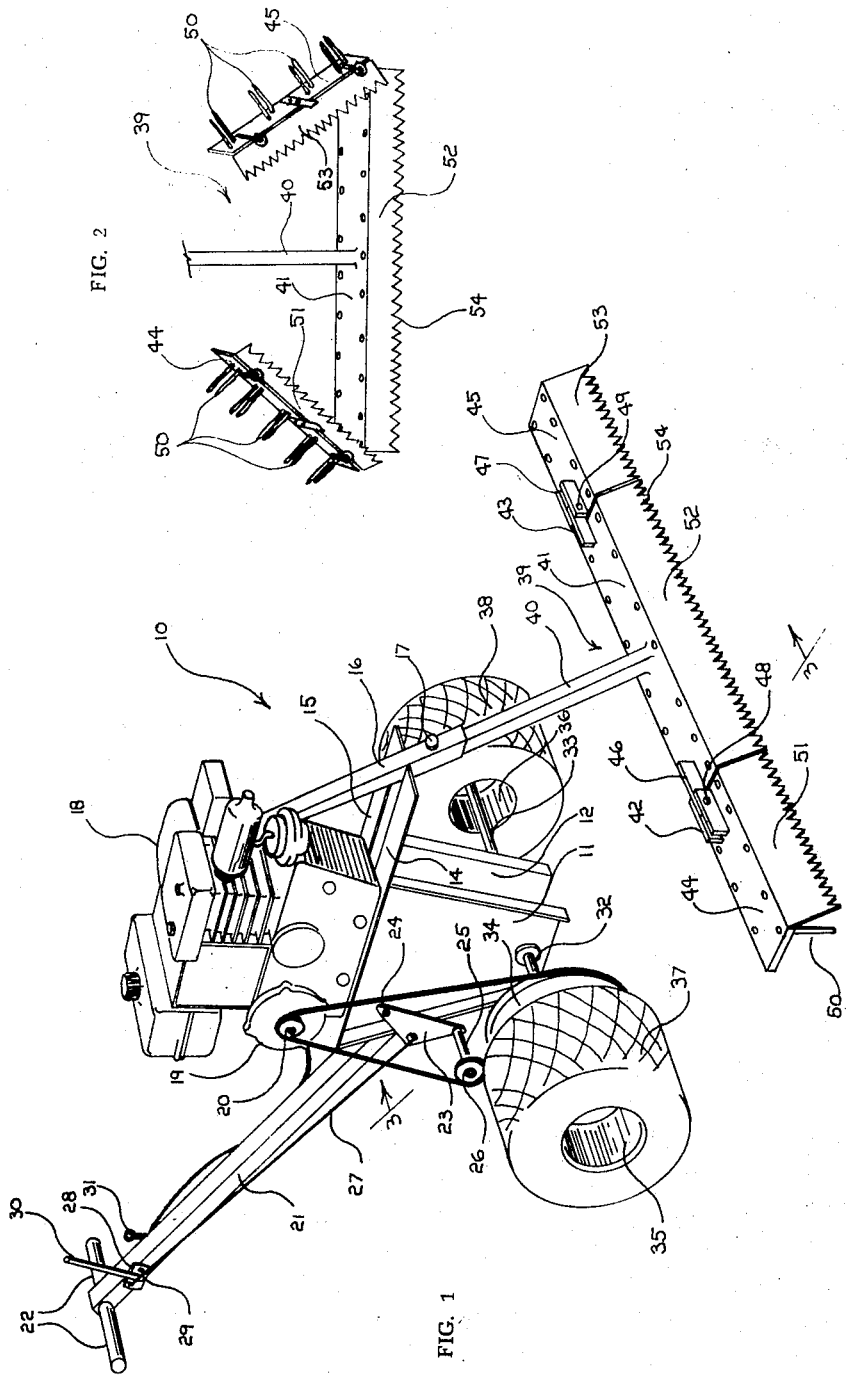

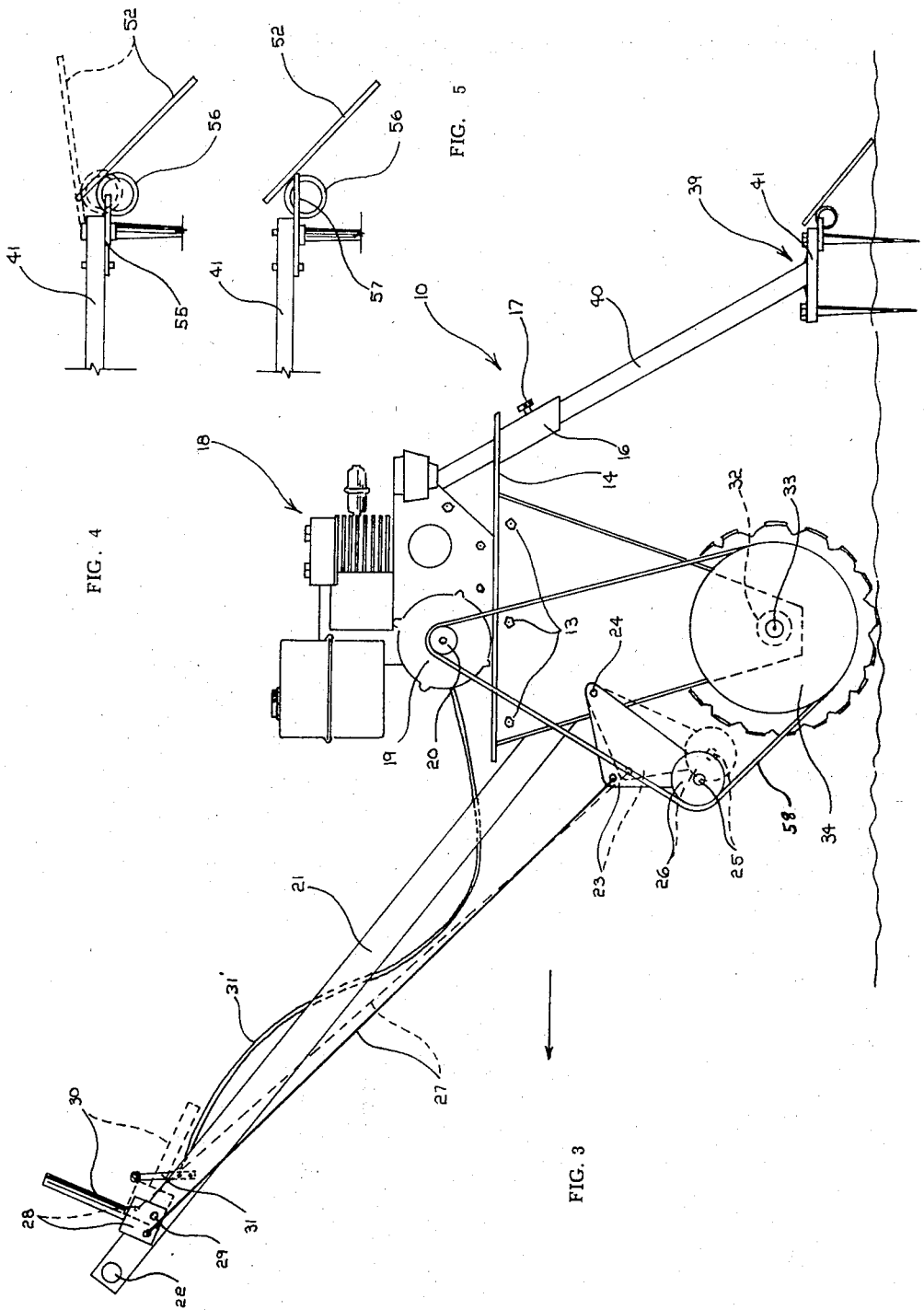

SANDTRAP MAINTENANCE DEVICE

This invention relates to earth working devices and more particularly to sandtrap maintenance devices.

One of the standard hazards placed on approaches to greens of golf courses are sandtraps. These traps are generally rather extensive in area and are preferably maintained in a smooth, contoured condition. This is usually accomplished by the laborious process of extensive raking by maintenance personnel. Players, however, who knock balls into these traps leave footprints and stroke or blast holes in the surface. Although a rake is usually left near the sandtrap, players invariably either do not smooth over their footprints and blast holes or do an inadequate job thereof. Further adverse weather conditions such as rain and baking sun harden and otherwise produce an undesirable sandtrap surface. Thus reconditioning of sandtraps is a constant golf course maintenance problem that requires considerable time and effort on the part of maintenance personnel.

The present invention has been developed after much research and study into the above mentioned problems and is designed to provide an efficient, self-propelled sandtrap maintenance device that contours and prepares the surface as well as hand raking without bogging down and otherwise adversely affecting the trap. The present invention is also designed as a light-weight unit for easy transportation that is foldable into a compact unit for storage and yet is expandable for maximum surface preparation per swath. Surface engaging elements of the present invention are jointed for accurate contouring of rolling trap surfaces.

It is an object, therefore, of the present invention to provide a self-propelled sandtrap maintenance device.

Another object of the present invention is to provide a self-propelled, attendant guided surface smoothing implement.

Another object of the present invention is to provide a self-propelled surface preparation device including a height adjustable working element.

Another object of the present invention is to provide a sandtrap type maintenance device including a hinged contouring working member.

Another object of the present invention is to provide a foldable, extensible working element attached to a self-propelled earth breaking and smoothing device.

A further object of the present invention is to provide a non-bogging, self-propelled, surface smoothing and contouring device.

An additional object of the present invention is to provide a belt driven, self-propelled, attendant guided, non-bogging sandtrap maintenance device.

Other objects and advantages of the present invention will become apparent and obvious from a study of the following description and the accompanying drawings which are merely illustrative of such invention.

In the drawings:

FIG. 1 is a perspective view of the sandtrap maintenance device of the present invention;

FIG. 2 is a front perspective view of the surface breaking and contouring element of the present invention;

FIG. 3 is a section taken through lines 3—3 of FIG. 1;

FIG. 4 is an enlarged sectional view of the hinge means between the support members to the rake panels; and FIG. 5 is an enlarged sectional view of the element limit flanges.

With further reference to the drawings, the self-propelled attendant guided sandtrap maintenance device of the present invention is indicated generally at 10. This device is composed of a pair of generally equal trapezoid shaped, parallely disposed basic frame members 11 and 12. Secured by means such as bolts 13 respectively to each of the base frame members along their upper parallel edges are motor and implement mounting members 14 and 15. Fixedly secured between these last two mentioned members by means such as welding is an implement mounting sleeve 16 with a set screw 17 threaded thereinto.

Bolted or otherwise secured to members 14 and 15 is a motor indicated generally at 18. This is preferably a standard gasoline type motor which, through transmission 19 drives pulley 20.

A forwardly projecting handle 21 is secured to the base frame members 11 and 12. On the outermost end of this handle are provided a pair of hand grips 22.

Pivotably secured to base member 11 is an idler plate 23. This plate is generally triangular in shape and pivots about point 24 which can be either a bolt or other mounting means.

Secured to the point of idler plate 23 farthest from pivot 24 is a pulley mounting shaft 25. Mounted to freely rotate on the end of shaft 25 opposite plate 23 is idler pulley 26.

To the third corner of triangular shaped plate 23 is secured a control rod 27. This rod is, of course, pivotably secured to such plate. The opposite end of rod 27 is secured to control plate 28 which is pivotably mounted at point 29 to the grip end of handle 21. A control lever 30 is fixedly secured to plate 28 so that the same can be moved into and from the position shown in dotted lines in FIG. 3.

A motor control lever 31 of standard construction can be mounted on the opposite side of handle 21 from plate 28 so that the motor 18 can be controllingly operated.

The lower portion, as oriented in the drawings, of each of the base members 11 and 12 carries a bearing such as that indicated at 32. These bearings rotatively mount axle 33. Fixedly secured to this axle, intermediate its ends and in alignment with motor pulley 20 and idler pulley 26, is drive pulley 34.

Mounted, one on each end of axle 33, are wheels 35 and 36 with preferably over-sized tires 37 and 38 carried thereon. At least one of the wheels is fixedly secured to axle 33; and for added traction both wheels may be so secured.

The earth working element of the present invention indicated generally at 39 is composed of an elongated, box frame type mounting arm 40 that is adjustably secured within implement sleeve 16 by set screw 17 at one end and is fixedly secured at the other end to central support member 41. As can clearly be seen in FIG. 3, support member 41 is attached to its mounting arm 40 at such an angle that said member is disposed, during operation of the maintenance device, in a plane generally parallel to the surface being prepared.

Secured respectively to opposite ends of the central support member are generally U-shaped hinge elements 42 and 43. Wing support elements 44 and 45 are disposed adjacent elements 42 and 43 respectively and have mating hinge elements 46 and 47 secured thereto.

Bolts or other suitable pins, such as those indicated at 48 and 49, pass through the mated hinge elements to provide a hinged joint between each of the wing support members and the central support member.

A plurality of surface and clod breaking tines 50 are staggeringly secured to the surface side of the central and wing support members. These tines are secured by any convenient means such as welded, threaded to receive nuts, or tapped to use bolt securing means. The last two mentioned methods are deemed preferably in that the tines would then be removably secured to their respective support members so that should such tines become bent, broken or otherwise damaged, they can be readily removed for repair or replacement.

Rake panels 51, 52 and 53 are hingedly connected, respectively, to support members 44, 41 and 45. The edge indicated at 54 on each of the panels opposite their hinged connections with their respective support members is serrated. Each of the rake panels is preferably made of sheet metal type material so that clumps or clods of surface material will not pass therethrough but will be broken up thereunder and smoothed in a raking action by said serration.

Each of the hinged connections between the rake panels and the support members is composed of an eye portion 55 bolted or otherwise secured to the support and a ring portion 56 welded or otherwise secured to the panel. Because of the size and location of the eye and ring portions, the panels are free to pivot or flap as surface contact may require.

To prevent the panels from falling perpendicular to the plane of the support members, and also to relieve stress on the eye and ring portion of the hinge connection, limit flanges 57 are provided. These flanges are preferably bolted or otherwise secured to the support members and project outwardly therefrom to engage the panel members when they are disposed at the desired downward angle.

In actual use of the sandtrap maintenance device of the present invention, such device is moved onto the edge of a sandtrap and if not already running, the motor 18 is started in the usual manner. Motor control 31, through cable 31', is used to remotely control the speed of the motor.

To begin the breaking up and smoothing operation, lever 30 is moved from the position shown in dotted lines in FIG. 3 to the position shown in solid lines. This movement, through connecting rod 27, pivots idler plate 23 about pivot point 24 to tightly engage idler pulley 26 with drive belt 58. Since motor 18 is running, the motor or drive pulley 20 is rotating. When idler pulley 26 is brought into tension engagement with belt 58, such belt will drive axle pulley 34. Since this pulley is fixed to axle 33 at least one of the wheels 35 or 36 will begin to rotate thus driving the device forward.

Due to the fact that control lever 30 is located adjacent the handles as is motor control 31, the stop and go motion of the device 10 can be accurately regulated.

Since the device of the present invention has one of its primary uses the contouring and smoothing of sandtraps, such device will move in the direction of the arrow in FIG. 3. Thus it can be seen that the attendant (not shown) walks in front of the device using handles 22 to guide the same. The attendant's footprints, of course, will be completely smoothed out by the device thus leaving no undesirable pits or scars in the surface behind the device.

Whenever a complete swath is made by the maintenance device or whenever further smoothing action is not desired, all the attendant has to do is push downwardly on handles 22 thus pivoting the entire device about axle 33 and disengaging the tines 58 and their associated rake panels from engagement with the surface being prepared or treated. Whenever the device has been repositioned for a second swath or for further operation, the operator can release pressure on handles 22 and can even pick up on the same to drive the tines 50 into the surface.

If, as the maintenance device moves across the surface being prepared, contours are encountered, wing members 44 and 45 are free to move upwardly thus preventing a possible non-contact area in what could be considered the valley portion of the contour. In other words, if a rising trap contour is encountered, the wing members will automatically contour themselves thereto thus assuring continuous tine contact all the way across the earth working element 39. The hinging of the rake panels 51, 52 and 53, of course, allows for variations in the tine depth without causing undesirable build-up of surface material behind such panels.

Whenever the smoothing maintenance of the sandtrap being prepared has been completed, the device 10 can be driven therefrom on its own power or can be otherwise removed to a storage area. To facilitate compact transport and storage, wing members 44 and 45 can be pivoted about pivot points 48 and 49 to the position shown in FIG. 2. Thus it can be seen that the width of space required for the device can be reduced by almost fifty per cent through the folding operation.

Should adjustment of the location of the earth engaging element 39 relative to the remainder of the device 10 be desired, all that is required is that set screw 17 be loosened and arm 40 adjusted longitudinally within sleeve 16. The set screw is then retightened to secure the relationship of the parts.

From the above, it is obvious that the present invention has the advantage of providing a much improved sandtrap maintenance device that is self-propelled and self-adjusting as to contours. The device of the present invention also has the advantage of being inexpensive to manufacture and yet sturdy in structure. The present invention additionally has the advantage of providing a self-propelled, attendant controlled device for breaking up surface material and to smooth the same in connected, adjacent operations.

The terms "front", "rear" and so forth have been used herein merely for convenience to describe the maintenance device of the present invention and its parts as oriented in the drawings. It is to be understood, however, that these terms are in no way limiting to the invention since the device may obviously be disposed in many different positions when in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A portable hand operated two wheel golf course sandtrap type surface breaking and smoothing device of the attendant guided type where the attendant walks and guides the device through sandtraps; said device comprising: a frame including a pair of generally like shaped vertical basic frame members disposed in laterally spaced apart relationship; a pair of surface engaging wheels rotatively mounted on and supporting said basic frame members; a generally flat motor and implement mounting structure secured to the top portion of said basic frame members; motor means mounted on said motor and implement mounting structure; means operatively connecting said motor means with said wheels to drive the same; an attendant guide and control means including a handle fixed to said frame and extending generally upwardly therefrom where the upper end thereof has a hand gripping portion; an implement mounting sleeve fixed to said frame on the side opposite said handle and projecting generally rearwardly and downwardly therefrom; an implement mounting arm slideably confined within said implement mounting sleeve and projecting generally downwardly therefrom; releasable securing means associated with said implement mounting sleeve for adjustably securing said implement mounting arm therein; and a surface working element secured to the lower end of said implement mounting arm rearwardly of said wheels and including a series of transversely aligned hingedly mounted tine plates each having a plurality of surface penetrating tines and a smoothing means in the form of an impervious plate having serrations along one edge thereof whereby a smooth, loose surface can be mechanizingly produced, and wherein the hinged connection between respective tine plates enable the working element to be foldable about at least a single axis extending parallel to the path of travel of the device and allow the working element to more accurately follow the contour of the sandtrap in which employed.

* * * * *